March 12, 1968     D. E. HARRIS     3,372,963

CORRUGATED BEARING RING

Filed Dec. 2, 1965

INVENTOR.
DWIGHT E. HARRIS

BY Brumbaugh, Free, Graves &
Donohue his     ATTORNEYS

United States Patent Office 3,372,963
Patented Mar. 12, 1968

3,372,963
CORRUGATED BEARING RING
Dwight E. Harris, Woodstock, N.Y., assignor to Rotron Manufacturing Company, Inc., Woodstock, N.Y., a corporation of New York
Filed Dec. 2, 1965, Ser. No. 511,065
5 Claims. (Cl. 308—236)

ABSTRACT OF THE DISCLOSURE

In the described embodiment of the invention, a corrugated bearing ring is interposed between the outer race of a conventional ball bearing and a supporting sleeve and secures the two elements against relative rotation. The bearing ring is formed of resilient material having a thickness so related to the radial clearance between the outer race of the ball bearing and the support sleeve that when assembled, the corrugations of the ring are essentially flattened out and the ring fills substantially all the clearance space between the ball bearing and the support sleeve.

---

This invention relates to bearing mounting devices and more particularly, to a corrugated bearing ring for securing a bearing element, such as a ball bearing race, against movement with respect to its supporting shaft or sleeve.

In order to avoid the difficulties encountered in the use of conventional bearing mounting techniques, such as press-fitting, cementing, axial clamping, etc., corrugated bearing rings have been employed to secure bearings against rotation with respect to their supporting members. While such corrugated bearing rings, for example as disclosed in the Björklund Patent No. 2,886,354, and the Dix et al. Patent No. 3,061,386, provide some improvement over earlier techniques, they present some disadvantages of their own and are relatively costly.

These prior art bearing rings are so designed that they are in contact with the bearing and supporting members only at the peaks or folds of the corrugations. As a result, several difficulties arise. For one, unless extreme accuracy of dimension of the corrugations is maintained, eccentricity of the bearing with respect to its supporting element will result. In one such device, this is minimized by machining the corrugations, an obviously expensive process. Even then, however, extreme care in assembly is necessary to avoid misalignment.

The life of these known bearing rings is also limited by fatigue problems arising from repeated deflection of the bearing ring at the points of support.

It is, therefore, the object of the present invention to provide an improved form of corrugated bearing ring mounting arrangement which avoids the shortcomings of presently known bearing mounting elements.

In accordance with the invention, a corrugated bearing ring is provided having a material thickness so related to the radial clearance between the bearing surface and its supporting member that when assembled, the corrugations are essentially flattened out and the ring fills substantially all of the clearance space between the parts. The bearing ring is fabricated of a deformable flat strip material, such as stainless steel spring shim stock, which may be stamped or simply rolled between a pair of mating gears to provide the corrugations. Such inexpensive forming methods may be used since accuracy and uniformity of the corrugations are not essential.

The bearing and the supporting shaft or sleeve are designed to have a radial clearance just sufficient to accommodate the material thickness of the ring. The edge of the shaft or sleeve preferably is slightly chamfered to facilitate assembly.

The design of the corrugation is such that the flattened ring produces the friction force necessary to fix the bearing element to its supporting member against rotation without exceeding the yield point of the ring material. Since the material thickness can be readily and accurately controlled, concentric alignment of the bearing and support is insured. Moreover, the fatigue problems arising from deflection of the bearing ring are avoided.

For more complete understanding of the present invention, reference may be had to the accompanying drawing in which.

For the purposes of illustration, the invention will be described as applied to a conventional ball bearing whose outer race is secured to a supporting sleeve. It will be understood, however, that the principles of the invention are equally applicable to the mounting of the inner race on a shaft or to any other type of bearing having a cylindrical surface to be fixed to a support member having complementary cylindrical surface.

Figure 1:
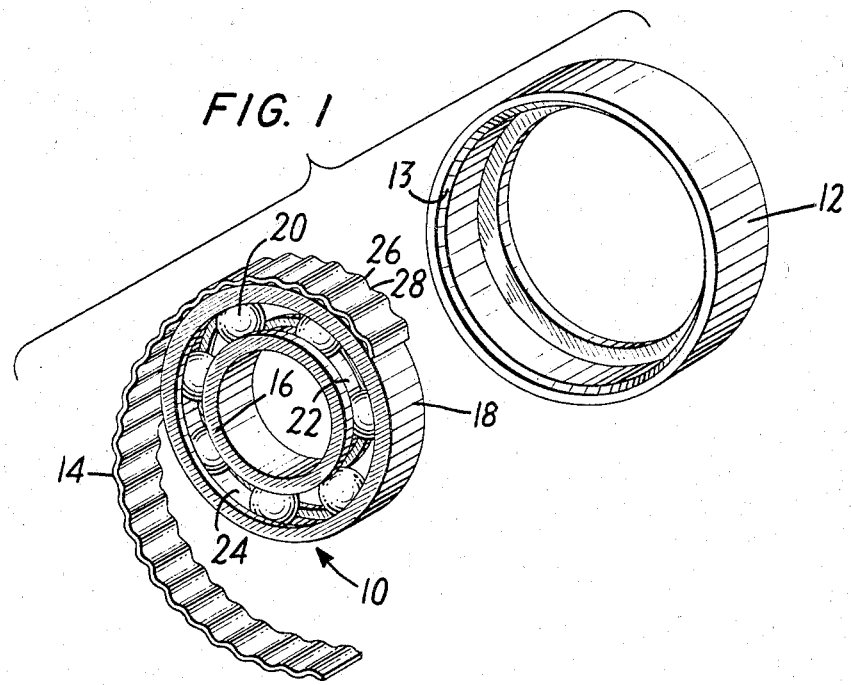
FIG. 1 is a perspective view of a ball bearing, a bearing ring and a supporting member illustrative of the invention, prior to assembly.
Figure 3:
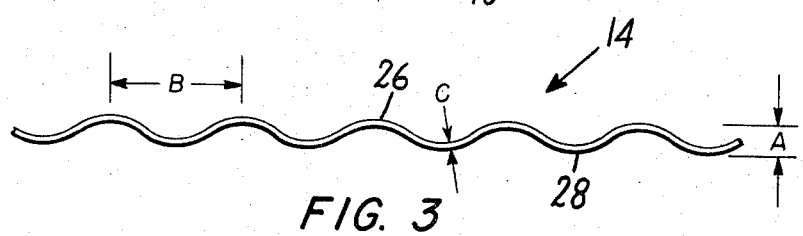
FIG. 3 is an edge view of the bearing ring showing the corrugation form.

Turning now to the drawings, FIG. 1 shows in unassembled form, a ball bearing assembly 10, a supporting sleeve member 12 and a bearing ring 14. The conventional ball bearing 10 includes an inner race 16, an outer race 18 and a plurality of balls 20 which run in a pair of curvilinear grooves 22 and 24 in the inner and outer race, respectively. The supporting sleeve 12 represents any type of machine element in which the bearing is to be mounted. Preferably, the interior edge of the sleeve 12 is provided with a chamfer 13 to facilitate assembly. The bearing ring or spacer 14, as mentioned above, may be formed of a thin, flexible, strip of stainless steel which is stamped or rolled between a mating set of gear elements to provide the steel with a surface of alternating peaks 26 and valleys 28. Prior to assembly, the spacer 14 would have a peak to valley corrugation thickness A and a peak to peak distance between corrugations B, as indicated in FIG. 3. The material thickness C would be substantially equal to the radial clearance between the race 18 and the inner bore of the sleeve 12.

The ring or spacer element 14 is cut to a length such that with its corrugations completely flattened, it will extend substantially completely around the outer bearing race 18. To assemble, the spacer strip 14 is wrapped around the bearing element 10, as indicated in FIG. 1, and the two members inserted in the sleeve 12. The chamfer 13 on the inner edge of the latter permits the edge of the spacer 14 to enter the sleeve easily and only a relatively small axial force on the bearing is required to complete the assembly. This feature is of importance since excess force applied to the bearing and/or sleeve could damage these parts.

Figure 2:
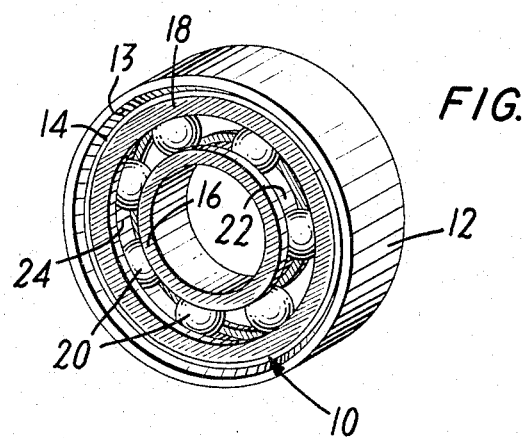
FIG. 2 is a perspective view of the elements of FIG. 1 after assembly.

With the elements assembled as shown in FIG. 2, the corrugated surface of the ring 14 is deformed to such an extent that the vertical distance A (FIG. 3), between the peaks 26 and valleys 28 of the ring 14 is reduced essentially to the material thickness C, i.e., the corrugations are flattened out.

The inherent spring stiffness or resilience of the steel tending to return to its corrugated shape produces sufficient frictional force between the spacer and both the outer surface of the race 18 and the inner surface of the sleeve 12 to lock them against relative rotation. Since the ring 14 is essentially uncorrugated or flat when in use, no concentrations of deflection forces arise to cause fatigue and possible failure. Moreover, the concentricity of the assembly is dependent upon easily achieved uniformity of the material thickness C of the bearing ring 14, rather than on the corrugation geometry. Therefore, the dimensions A and B of FIG. 3 are not critical.

As will be appreciated, the bearing mounting arrangement described above affords advantages not available with prior art devices. Its basic function of securing the bearing against rotation with respect to its supporting member is reliably accomplished at relatively low cost. The only dimensions requiring accurate control are the thickness of the spring stock used for the corrugated spacer and the radial clearance between the bearing element and the supporting member, both of which are easily and inexpensively attained.

The described system enables simple installation of bearings without subjecting them to distorting forces and also permits ready replacement if the bearing becomes worn or damaged. Radial movement of the bearing relative to its supporting member is negligible, thereby reducing noise and wear. Moreover, the resilience of the spacer allows for a small amount of self-alignment, should there be some minor variations in the radial clearance between the bearing and its supporting member. However, since the corrugations of the spacer are essentially flattened out when installed, no concentrations of flexural forces can arise and the possibility of fatigue failure is minimized.

It will be recognized that various modifications of the invention will occur to those skilled in the art. For example, as indicated above, the corrugated bearing ring could be used for inner race mounting of a ball bearing on a shaft, or for mounting any other type of bearing on a supporting member. It is also applicable to the securing of any form of element having a cylindrical surface to a supporting member having a complementary cylindrical surface, where relative rotation therebetween is to be prevented. Accordingly, it will be understood that the embodiment of the invention disclosed herein is illustrative and the full breadth of the invention is defined in the appended claims.

I claim:

1. A bearing assembly comprising a bearing element having a first cylindrical surface, a supporting member with respect to which said first cylindrical surface is to be secured against rotation, said supporting member having second cylindrical surface complementary to said first surface, said first and second cylindrical surfaces having different diameters to present a given radial clearance therebetween, and a spacer between said first and second surfaces to secure said element and member in assembled relationship, said spacer being of resilient material having a thickness substantially equal to said radial clearance and prior to assembly, being formed with a plurality of axially extending corrugations of a height substantially greater than said radial clearance.

2. A bearing assembly according to claim 1 wherein said first cylindrical surface comprises the outer surface of said bearing element and said second cylindrical surface comprises the wall of a bore in said supporting member, and wherein the edge of said bore is chamfered to facilitate insertion of said bearing element and spacer into said bore.

3. A bearing assembly according to claim 1 wherein said spacer is formed of stainless steel spring strip material.

4. A bearing assembly according to claim 1 wherein the spacer has a length with the corrugations flattened out substantially equal to the circumferential length of the radial clearance space between the first and second cylindrical surfaces.

5. A non-rotatable coupling comprising, a first member having a cylindrical surface, a second member having a complementary cylindrical surface, said cylindrical surfaces having different diameters to present a given radial clearance therebetween, and a spacer inserted between said cylindrical surfaces to secure said members together in non-rotatable relationship, said spacer being of resilient strip material having a thickness substantially equal to said given radial clearance and prior to insertion between said cylindrical surfaces, being formed with a plurality of axially extending corrugations of a height substantially greater than said radial clearance, whereby upon insertion of said spacer, said corrugations are essentially flattened out and said spacer substantially fills the annular space between said members.

References Cited

UNITED STATES PATENTS 2,931,412   4/1960   Wing _____ 151—41.7
2,992,868   7/1961   Vacha _____ 308—236

CARLTON R. CROYLE, *Primary Examiner.*

FRANK SUSKO, *Examiner.*